US005583578A

United States Patent [19]

Tateishi

[11] Patent Number: 5,583,578

[45] Date of Patent: Dec. 10, 1996

[54] PROJECTION-TYPE VIDEO DISPLAY APPARATUS CAPABLE OF CORRECTING AN ASYMMETRICAL BRIGHTNESS DISTRIBUTION

[75] Inventor: Masaru Tateishi, Hyogo, Japan

[73] Assignee: Mitsubishi Denki Kabushiki Kaisha, Chiyoda-ku, Japan

[21] Appl. No.: 610,750

[22] Filed: Mar. 4, 1996

[30] Foreign Application Priority Data

Oct. 12, 1995 [JP] Japan .................................... 7-264201

[51] Int. Cl.[6] ................................ H04N 5/21; H04N 5/74

[52] U.S. Cl. .......................... 348/615; 348/687; 348/745; 315/383

[58] Field of Search ............................ 348/615, 687–689, 348/686, 678, 745–747, 776, 778, 805–807, 181, 189, 190; 345/20, 147–149; 315/379, 382.1, 383; H04N 5/21, 5/213, 5/74, 9/31, 5/57

[56] References Cited

U.S. PATENT DOCUMENTS

| | | | |
|---|---|---|---|
| 3,976,991 | 8/1976 | Hickin et al. | 345/16 |
| 4,631,576 | 12/1986 | St. John | 348/615 |
| 4,670,778 | 6/1987 | Miyakawa | 348/615 |
| 4,868,668 | 9/1989 | Tavernetti | 348/687 |

FOREIGN PATENT DOCUMENTS 63-268380 11/1988 Japan .

*Primary Examiner*—Micheal H. Lee
*Attorney, Agent, or Firm*—Burns, Doane, Swecker & Mathis, LLP

[57] ABSTRACT

The gain of a variable gain amplifier for amplifying a video signal is changed in accordance with a brightness correction control signal that is output from a waveform ROM. The shape of the output signal of the waveform ROM is changed in accordance with a signal indicating the scanning position which signal is deformed in accordance with an external signal indicating a deviation of a hot spot.

3 Claims, 7 Drawing Sheets

11 SR
21 VARIABLE GAIN AMPLIFIER
31
41
12 SG
22 VARIABLE GAIN AMPLIFIER
32
42
13 SB
23 VARIABLE GAIN AMPLIFIER
33
43
50 WAVEFORM ROM
53 SCY
f (x) 63
f (y) 64
FUNCTION GENERATOR
61
SPH
71
51 SPV
SPH 52

PROJECTION-TYPE VIDEO DISPLAY APPARATUS CAPABLE OF CORRECTING AN ASYMMETRICAL BRIGHTNESS DISTRIBUTION

BACKGROUND OF THE INVENTION

1. Field of the Invention

The present invention relates to a technique of correcting for a variation in the brightness distribution of a projection-type video display apparatus (also called a video projector in the following description). In particular, the invention is effective in correcting for such variations in mass-production of the projection-type video display apparatus.

2. Description of the Related Art

FIG. 8 is a block diagram showing a brightness correction circuit of a conventional projection-type display apparatus disclosed in Japanese Unexamined Patent Publication No. Sho. 63-268380. FIGS. 9–11 illustrate the operation of the circuit of FIG. 8.

In a video projection lens system of a video projector or the like, a lens barrel has a given length and the solid angle becomes smaller as the direction inclines more from the optical axis. Therefore, as shown in FIG. 11, what is called a shading phenomenon occurs in which the brightness in a peripheral portion CR of a screen 100 is lower than in a central portion, deteriorating picture quality.

The circuit of FIG. 8 has been proposed to eliminate such a center/periphery brightness variation in a picture.

In the circuit of FIG. 8, input terminals 11–13 are supplied with an R (red) video signal $S_R$, a G (green) video signal $S_G$, and a B (blue) video signal $S_B$, i.e., three primary color video signals. These signals are sent, via variable gain circuits 21–23 (video signal amplifying means) such as voltage-controlled amplifiers), to CRTs of the primary colors, i.e., a red-light emission CRT 31, a green-light emission CRT 32, and a blue-light emission CRT 33.

Light beams emitted from the respective CRTs 31–33 are projected onto a screen such as the screen 100 via lenses 41–43. Gain control terminals of the respective variable gain circuits 21–23 are supplied with a brightness correction control signal of a given waveform as read out from a waveform ROM 50 (storing means).

The waveform ROM 50 is supplied with a brightness adjustment signal $SC_Y$ from a terminal 53, as well as vertical and horizontal sync signals $SP_V$ and $SP_H$ from terminals 51 and 52. In general, the brightness adjustment signal $SC_Y$ is produced by manually operating, for instance, a brightness adjustment knob of the video projector. Alternatively, brightness adjustment may be performed automatically in accordance with an automatically detected light quantity at an installation location (e.g., brightness of a room) of the video projector.

In the circuit of FIG. 8, a brightness correction control signal as read out from the waveform ROM 50 is supplied to the variable gain circuits 21–23 while the screen is scanned two-dimensionally according to the vertical and horizontal sync signals $SP_V$ and $SP_H$. As a result, gain control is effected as shown in FIG. 9 and brightness correction is performed on the screen as shown in FIG. 10.

FIGS. 9 and 10 respectively show, using as a parameter the level of the brightness adjustment signal $SC_Y$ supplied to the terminal 53, how the gain and the brightness vary in the horizontal (or vertical) direction of the screen. Curves a, b, . . . , g are obtained in this order as the level of the brightness adjustment signal $SC_Y$ decreases, i.e., as the brightness setting becomes lower. Dashed lines in FIG. 10 represent brightness values on the screen that are obtained when no brightness adjustment is performed.

In the case of curves d, e, f and g of FIG. 10 which correspond to low brightness control levels, uniform brightness is obtained over the entire display screen on which a video image is projected. That is, the unevenness in brightness indicated by the dashed lines in FIG. 10, i.e., the phenomenon that the brightness is lower in the screen peripheral portion (horizontal and vertical end portions) than in the screen central portion is compensated for by sending a brightness correction control signal (curves d, e, f and g in FIG. 9) from the waveform ROM 50 to the variable gain circuits 21–23.

As described above, the waveform ROM 50 stores a brightness correction control signal of a given waveform. In mass-producing a large number of video projectors of the same specification, the waveform ROM 50 stores the same brightness control correction signal for those video projectors with an assumption that they have approximately the same unevenness in brightness.

However, in practice, when a large number of video projectors are produced, it is not always the case that all the projectors have a maximum brightness value at the screen center. The unevenness in brightness occurs due to a variety of factors such as angular errors in mounting angles of the lenses 41–43, errors in the brightness of the CRTs 31–33, errors in the gains of the variable gain circuits 21–23, an error in the transmittance of the screen (not shown in FIG. 8), and even a brightness variation in a room where the projector is installed (e.g., a brightness difference between two horizontally distant locations). Therefore, strictly speaking, different brightness correction control signals should be prepared for respective projectors. However, it is difficult to prepare a number of correction characteristics that are to be stored in the waveform ROM 50 and select one of those characteristics for each projector.

Actually, in many cases, it is necessary to make the characteristic curves (see FIG. 9) asymmetircal so that peaks are deviated from the center rightward or leftward. That is, if the same brightness correction control signal is stored in the waveform ROM, it is difficult to equalize the brightness characteristics of a large-number of mass-produced video projectors. Further, although a user can adjust the brightness for the entire screen, he cannot adjust a balance of brightness among several locations on the screen.

SUMMARY OF THE INVENTION

An object of the present invention is to provide a projection-type video display apparatus capable of adjusting a brightness balance. Another object of the invention is to provide a projection-type video apparatus that allows a user to adjust a brightness balance.

According to the invention, there is provided a projection-type video display apparatus which projects, onto a second screen, an image that is formed on a first screen by scanning it, comprising:

storing means for storing data indicating at least a brightness difference between a central portion and a peripheral portion of the second screen, and for outputting a brightness correction control signal so that it corresponds to a signal indicating a scanning position of the first screen;

amplifying means for amplifying an image signal, a gain of the amplifying means being changed in accordance with the brightness correction control signal that is output from the storing means;

maximum brightness point input means for allowing input of a maximum brightness point signal indicating a deviation of a maximum brightness point on the second screen; and function generating means for changing a shape of the signal indicating the scanning position of the first screen in accordance with the maximum brightness point signal.

In the above apparatus, the maximum brightness point input means may comprise first operating means for allowing input of a signal indicating a horizontal component of the deviation of the maximum brightness point, and a second operating means for allowing input of a signal indicating a vertical component of the deviation of the maximum brightness point.

The above apparatus may have a remote controller that is provided with the first and second operating means.

DESCRIPTION OF THE PREFERRED EMBODIMENTS

Figure 1:
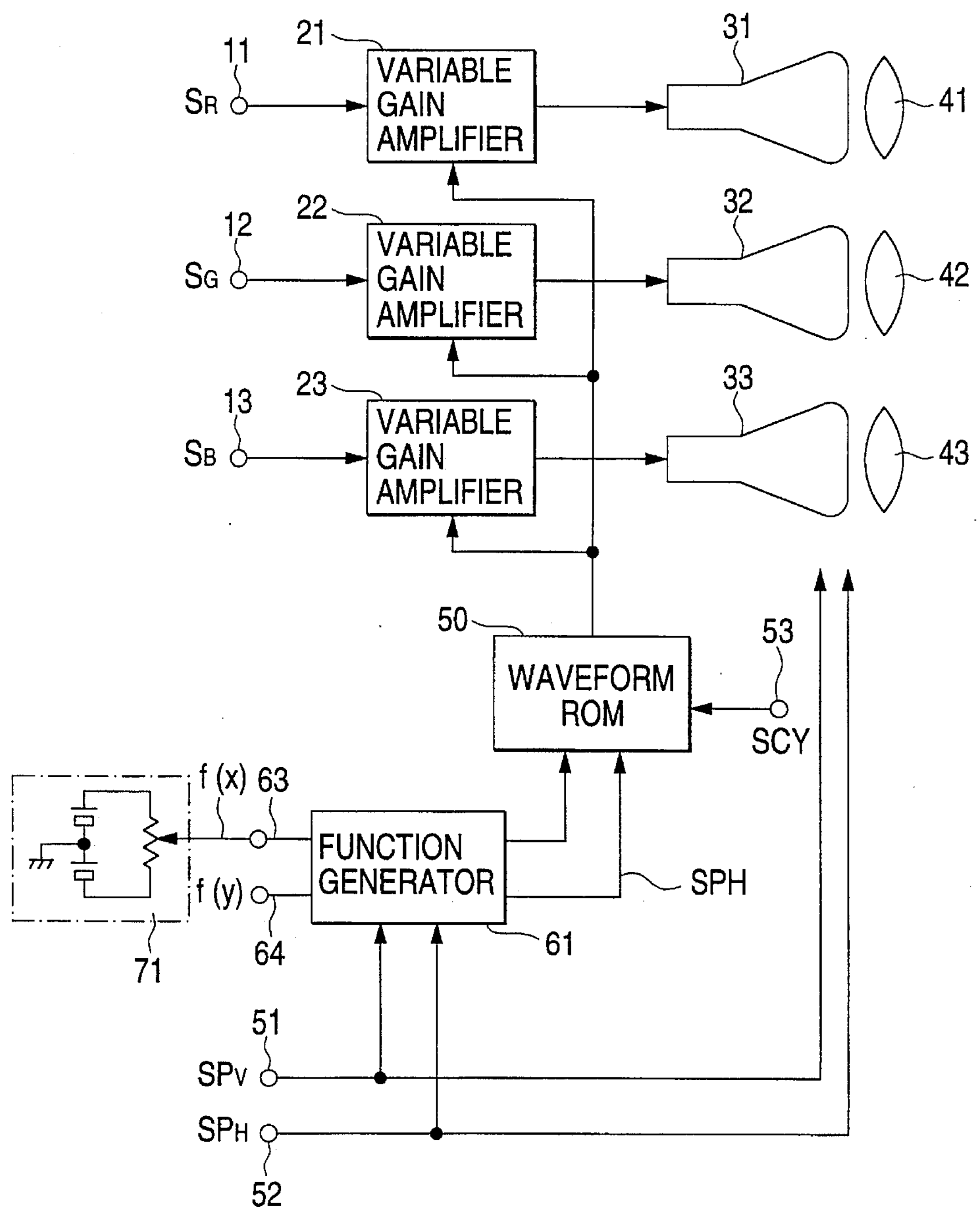
FIG. 1 is a block diagram showing a brightness correction circuit of a projection-type video display apparatus according to a first embodiment of the present invention.

FIG. 1 is a block diagram showing a brightness correction circuit of a video projector according to a first embodiment of the present invention. In FIG. 1, reference numerals 11–13 denote input terminals of R, G and B video signals; 21–23, amplifiers (video signal amplifying means) for the R, G and B video signals; 31–33, CRTs for R, G and B; and 41–43, lenses for projecting images of the CRTs 31–33 onto a screen (not shown) while combining those into a single image.

Reference numerals 51 and 52 represent input terminals of vertical and horizontal sync signals $SP_V$ and $SP_H$, respectively, which are not only input to a function generator 61 but also used for vertical and horizontal scanning operations of the CRTs 31–33.

A waveform ROM 50 (storing means) stores standard values (waveform) of a brightness correction control signal, i.e., correction values of the gains of the variable gain amplifiers 21–23 in the horizontal and vertical directions. An input terminal 53 receives a brightness adjustment signal $SC_Y$ that indicates a brightness level of the entire screen.

The function generator 61 (function generating means) generates, in accordance with horizontal and vertical components f(x) and f(y) of a signal indicating the position of a brightest point (hereinafter called a hot spot) of the screen which signal is externally supplied via terminals 63 and 64, distortion functions to be superimposed on the linear signals to distort brightness correction control signals produced by the waveform ROM 50.

A circuit 71 for generating the signal f(x) (maximum brightness point input means) consists of positive and negative constant voltage sources and an operable variable resistor.

Figure 2A:
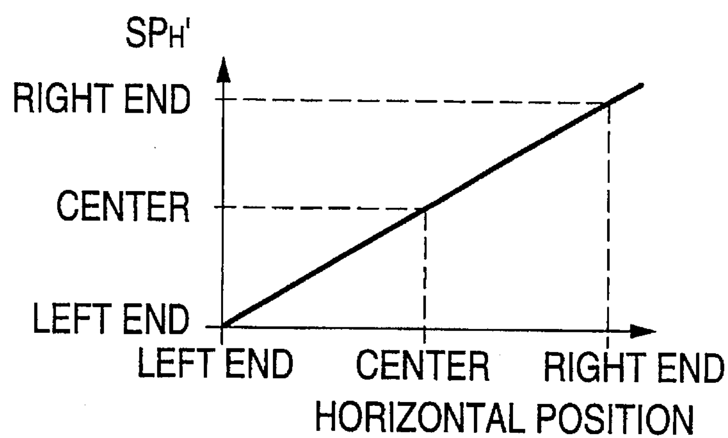
FIGS. 2A–2C are graphs showing characteristics of a function generator used in the circuit of FIG. 1.
Figure 2B:
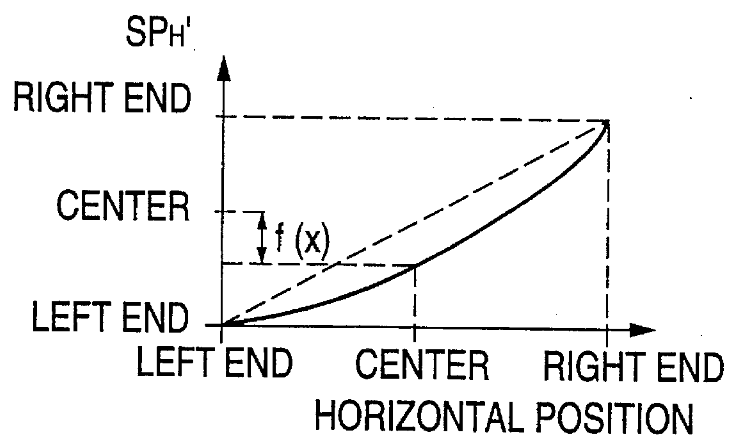
Figure 2C:
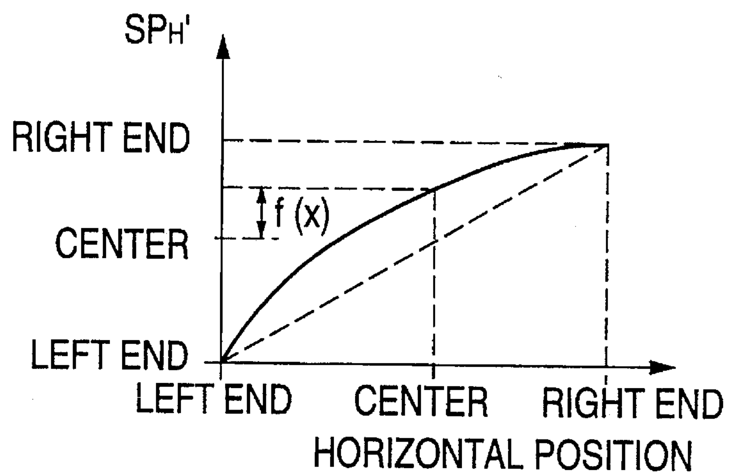

FIGS. 2A–2C show characteristics of the function generator 61. FIGS. 2A–2C are directed to only the operation in the horizontal direction, because the operations in the horizontal and vertical directions are based on the same principle of operation though their periods are much different from each other.

FIGS. 2A–2C show input/output characteristics of the function generator 61, in which the horizontal and vertical axes represent an input signal $SP_H$ and an output signal $SP_H'$ of the function generator 61, respectively. FIG. 2A shows a case of a linear input/output characteristic, FIG. 2B shows a case of producing a distorted output signal $SP_H'$ that is smaller than the linear characteristic, and FIG. 2C shows a case of producing a distorted output signal $SP_H'$ that is larger than the linear characteristic.

The input/output characteristics of the function generator 61 shown in FIGS. 2A–2C are such that the output signal $SP_H'$ is zero when the input signal $SP_H$ is corresponds to the left-side end of the screen and has a maximum value when the input signal $SP_H$ corresponds to the right-side end of the screen.

Each characteristic curve is smooth from zero to the maximum value. When the input signal $SP_H$ corresponds to the screen center, the output signal $SP_H'$ is produced by addition of the horizontal component f(x) of the externally input signal indicating the position of a hot spot.

Therefore, the input/output characteristic becomes linear if f(x) is zero, downward convex if f(x) is negative, and upward convex if f(x) is positive. It is noted that for the purpose of sweeping the screen, the signal $SP_H$ is sent to the CRTs 31–33 directly, i.e., without passing through the function generator 61.

A description will now be made of the signal f(x) that indicates the position of a hot spot.

Figure 3:
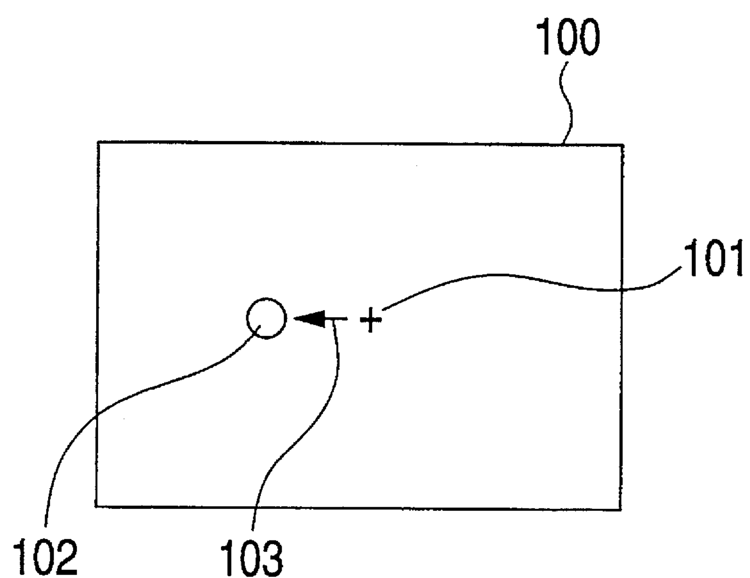
FIG. 3 illustrates a deviated hot spot.

Referring to FIG. 3, reference numeral 100 denotes a screen and 101 represents the center (in both horizontal and vertical directions) of the screen 100.

Reference numeral 102 denotes a hot spot (maximum brightness point on the screen 100), and 103 represents a horizontal distance between the hot spot 102 and the center 101. The signal f(x) is proportional to the horizontal distance 103. The signal f(x) is positive if the hot spot 102 is located on the left side of the center 101, and negative if it is located on the right side of the center 101. The signal f(x) is zero if the hot spot 102 is located at the center 101.

The other signal f(y) is proportional to a deviation in the vertical direction. As in the case of the signal f(x), the polarity of the signal f(y) is reversed depending on whether the hot spot 102 is located above or below the center 101.

Now, a brightness correcting operation of the video projector of this embodiment will be described for a case where the hot spot 102 is located on the left side of the screen center 101 as shown in FIG. 3.

The position of the hot spot 102 may be determined by a person by visual inspection, or by using a brightness measuring device (on the market). In either case, $f(x)_{x=103}$ is externally input in accordance with the distance 103 (positive in the case of FIG. 3 because the hot spot 102 is located on the left side) of the hot spot 102.

Based on the signal f(x), in this case the function generator 61 assumes the characteristic shown in FIG. 2C, in which the output signal $SP_H'$ is larger than the linear characteristic.

The output signal $SP_H'$ is input to the waveform ROM 50. Therefore, for instance when the center in the horizontal direction is just scanned (the portion of the signal $SP_H$ corresponding to the center is just used), the input signal to the waveform ROM 50 has a value as if to scan a position between the center and the right-side end.

Figure 4:
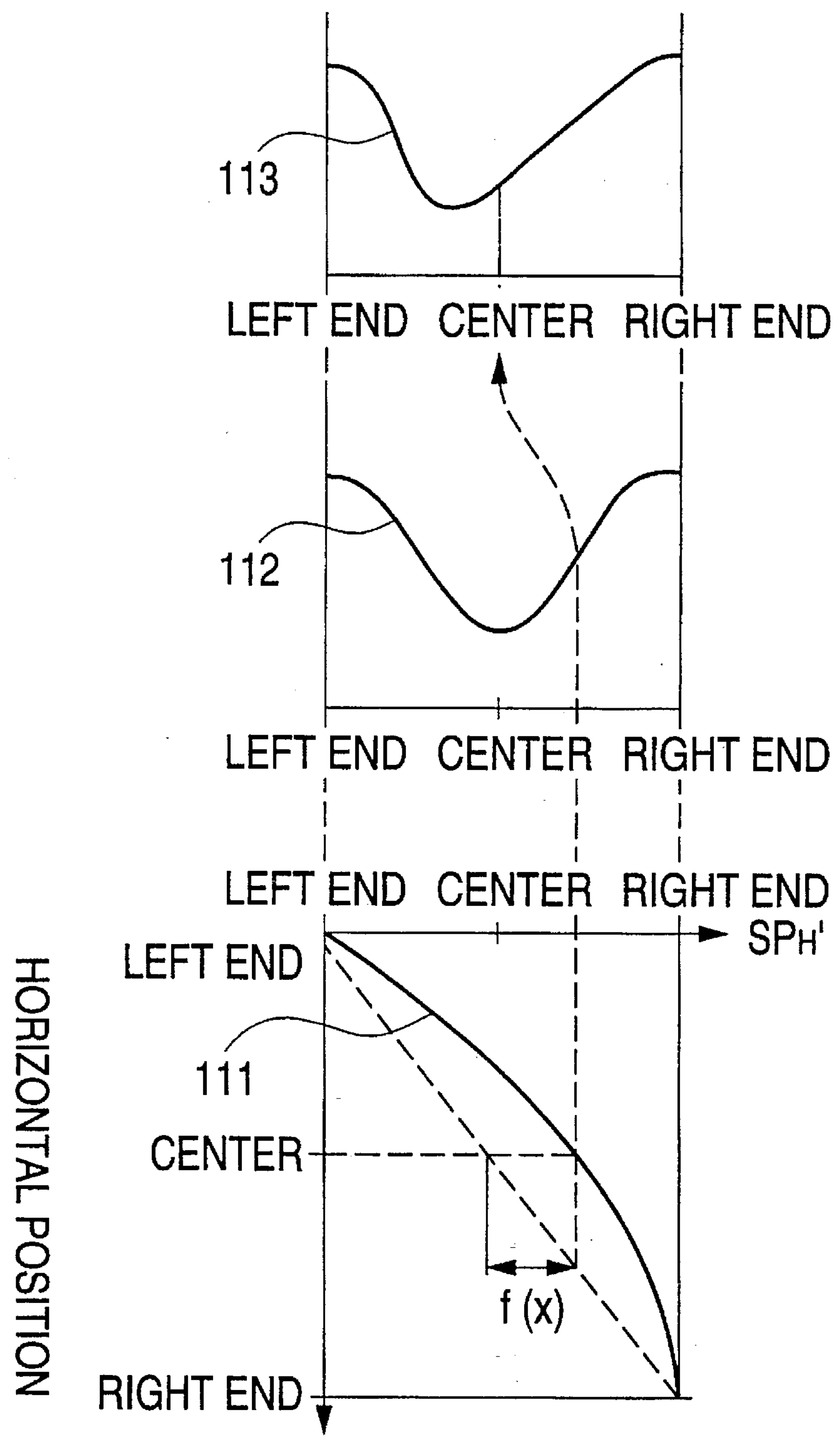
FIG. 4 shows the operation of the brightness correction circuit of FIG. 1.

To facilitate understanding of the above, a characteristic curve 111 of the function generator 61, a characteristic curve 112 stored in the waveform ROM 50, and a characteristic curve 113 actually output from the waveform ROM 50 are shown in FIG. 4 so as to have the same scale that represents the horizontal position on the screen 100. The characteristic curve 111 is the same as that shown in FIG. 2C.

Figure 9:
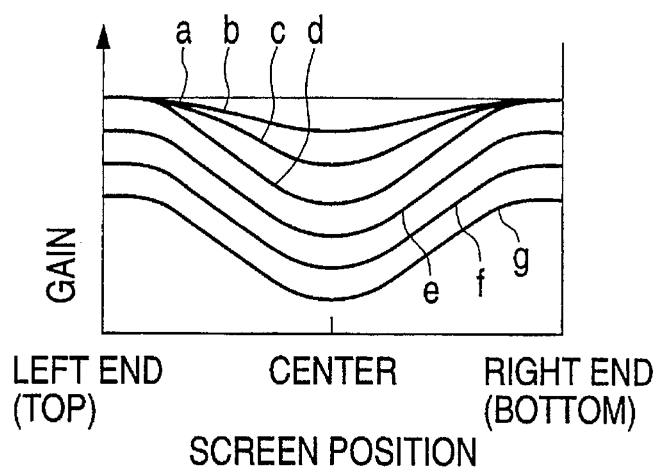
FIG. 9 is a graph showing a characteristic of a waveform ROM used in the circuit of FIG. 8.
Figure 10:
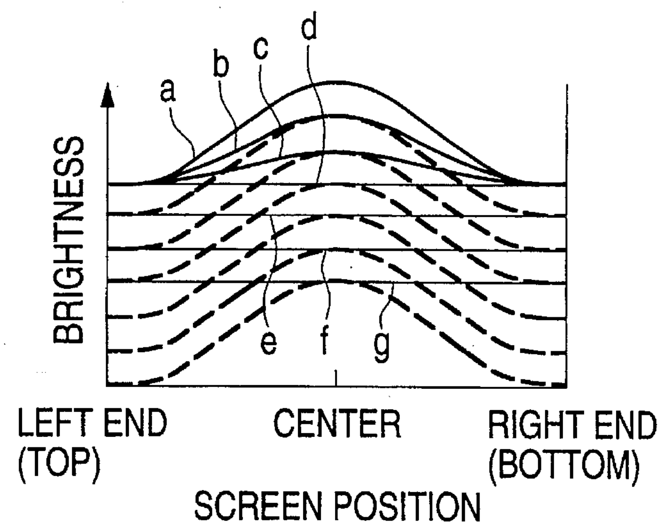
FIG. 10 is a graph showing brightness correction of the circuit of FIG. 8.
Figure 11:
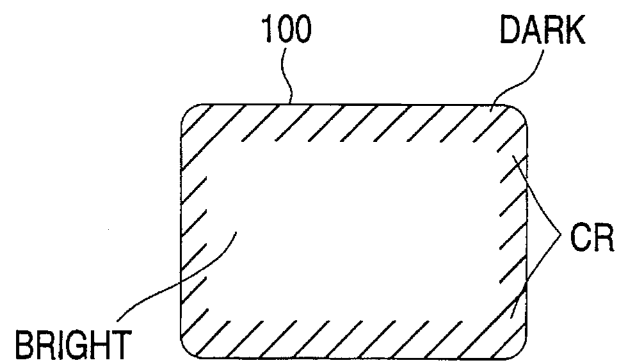
FIG. 11 illustrates a shading phenomenon.

The characteristic curve 112 stored in the waveform ROM 50 is similar to curves e, f and g shown in FIG. 9. At the left-side end and the right-side end of the screen 100, the output signal $SP_H'$ of the function generator 61 is the same as the linear characteristic; therefore, the waveform ROM 50 outputs a value that is equal to a stored value.

However, when the center of the signal $SP_H$ is used, the output signal $SP_H'$ of the function generator 61 is larger than the linear characteristic by f(x). Therefore, as illustrated in FIG. 4, the waveform ROM 50 outputs a value that is located on the curve 112 at a position between the center and the right-side end.

Thus, the output signal of the waveform ROM 50 has a peak position that is shifted leftward to a position corresponding to the hot spot 102 shown in FIG. 3 (see the curve 113 of FIG. 4).

In the above manner, by inputting a proper signal f(x) to the function generator 61, the output signal of the waveform ROM 50 can be so changed that its peak position is shifted rightward or leftward on the screen 100 from that of the stored characteristic curve, to reach an arbitrary position.

An operator need not always know the value of the signal f(x), but can attain the object by adjusting the signal f(x) while looking at a result of the brightness adjustment which appears on the screen 100.

The device for generating the signal f(x) may be a simple, variable voltage source as typified by the circuit 71 shown in FIG. 1. An operation knob (not shown; operating means for adjusting the horizontal position of a maximum brightness point on the screen 100) may be provided, for instance, in a remote controller of the video projector. The same things apply to the vertical position on the screen 100.

Although the above description is directed only to the horizontal direction, the brightness adjustment can be performed no matter how the hot spot 102 is deviated on the screen 100 by using the circuits having the same configuration for the horizontal and vertical directions.

Since the brightness adjustment can be left to a user, the rate of occurrence of brightness adjustment failures in mass-production of video projectors can be reduced. The waveform ROM 50 may be replaced by a RAM if it is loaded with data at every activation of the apparatus.

Embodiment 2

Figure 5:
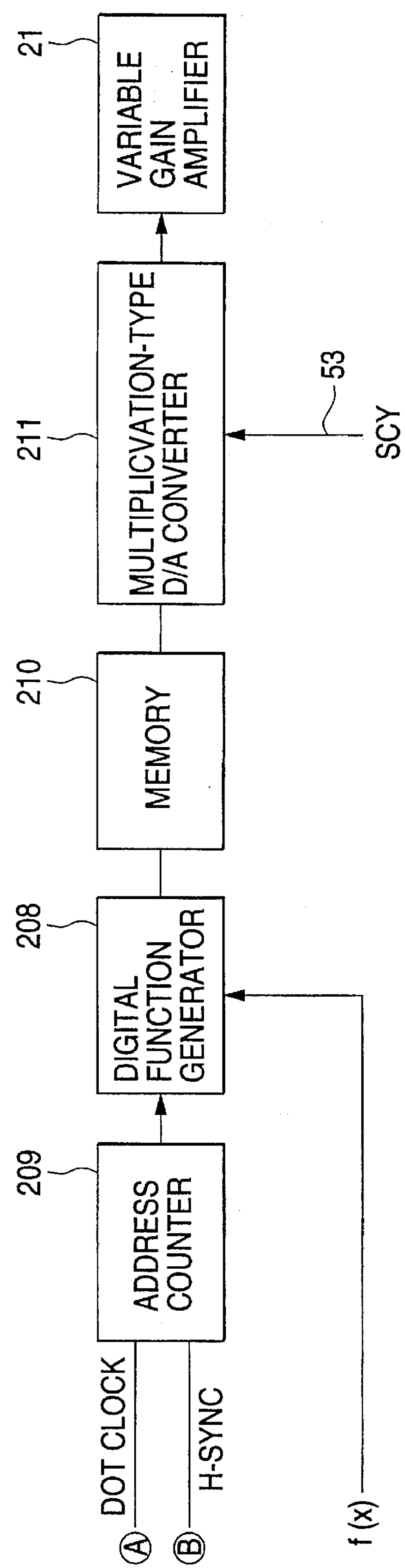
FIG. 5 is a block diagram showing a brightness correction circuit of a projection-type video display apparatus according to a second embodiment of the present invention.

FIG. 5 shows a brightness correction circuit of a video projector according to a second embodiment of the invention, in which components corresponding to the function generator 61 and the waveform ROM 50 of FIG. 1 are constituted of digital circuits.

Figure 6:
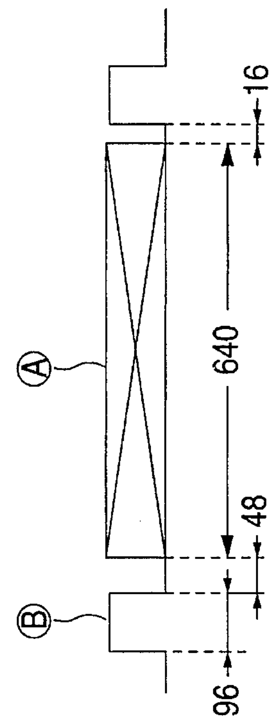
FIG. 6 shows a dot clock signal and a horizontal sync signal.

In FIG. 5, symbol (A) denotes an input dot clock signal and symbol (B) represents a horizontal sync signal. FIG. 6 shows detailed timing of these signals.

In FIG. 5, a memory 210 stores data to be used for processing video signals. An address counter 209 performs address designation of the memory 210. Reference numeral 211 denotes a multiplication-type D/A converter.

Receiving a digital position signal f(x) indicating the position of a hot spot, a digital function generator 208 alters an address signal sent from the address counter 209 and supplies the altered signal to the memory 210. The characteristic and the operation of the digital function generator 208 are basically the same as those of the analog function generator 61 shown in FIG. 2.

The operation of the above circuit will be described for a case where a hot spot 122, which should be located at the center of a screen 121, is actually located at a position 123 and one data of the memory 210 consists of 8 bits.

The address counter 209 is reset by the horizontal sync signal (B), and then incremented by 1 every time a pulse of the dot clock signal (A) is input. As the screen 121 is swept from left to right, the address signal having a value indicating a horizontal position is input to the digital function generator 208.

If the hot spot 122 is located at the center of the screen 121, the deviation signal f(x) is zero. Therefore, the function generator 208 outputs an input value of the address signal without altering it. If f(x) has a certain magnitude, the function generator 208 outputs a corrected address signal as shown in FIGS. 2B and 2C and the memory 210 outputs values as represented by curve 124 in FIG. 7.

The gain of the output values of the memory 210 is adjusted by the D/A converter 211, and resulting values are multiplied by a video signal in the variable gain amplifier 21. A resulting video signal has a minimum value at a position on the left side of the center and a maximum value at both ends. As a result, the hot spot 122 disappears and the screen 121 has a brightness distribution that is closer to a uniform one.

The brightness correction in the horizontal direction has been described above. The brightness correction in the vertical direction is performed in the same manner as in the horizontal direction.

According to the above method, the intensity of the hot spot 122 (signal $SC_Y$) and its deviation from the center can be adjusted by a remote controller or the like through a microprocessor. Further, the periphery/center brightness ratio can be corrected by setting the gain for the peripheral portion larger than that for the center.

Figure 7:
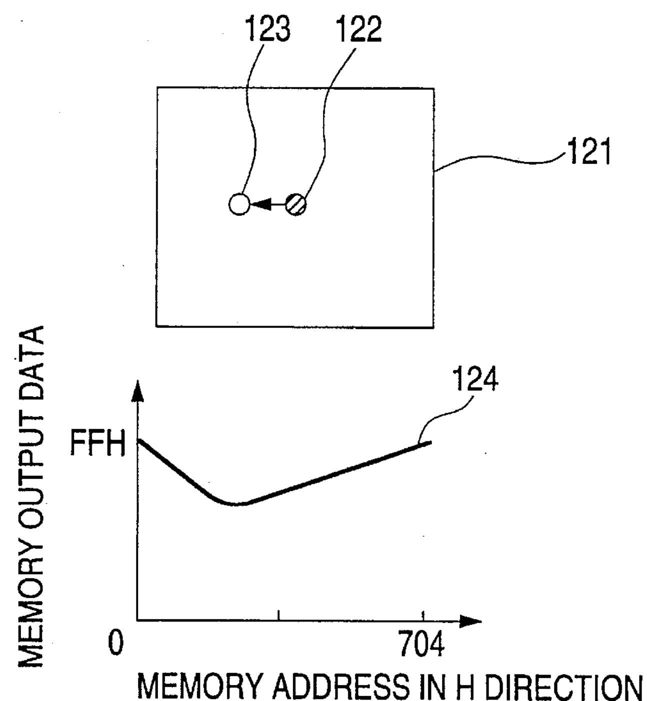
FIG. 7 shows the operation of the brightness correction circuit of FIG. 5.
Figure 8:
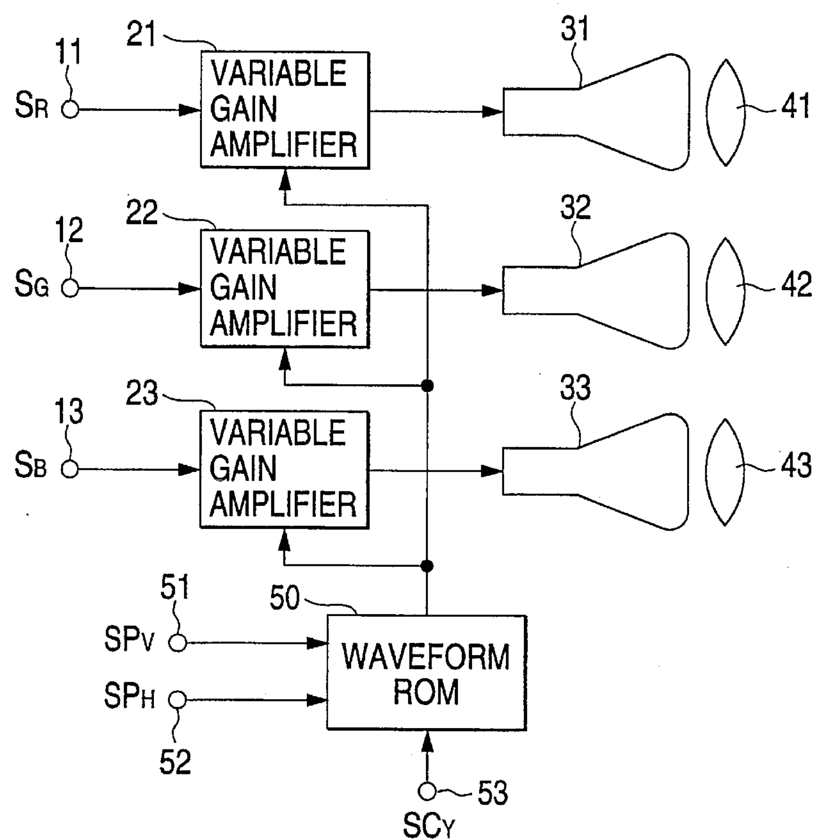
FIG. 8 is a block diagram showing a brightness correction circuit of a conventional projection-type video display apparatus.

FIG. 7 shows the output data of the memory 210 for only one color. Since the upper limit of the output data can be reduced in accordance with the intensity of each of R, G and B, chromaticity adjustment can also be performed.

Since the entire correction data can be set through calculation of a microprocessor using software, brightness correction of any shape can be performed even though it is complex.

With the above-described brightness correction of a video projector, it can be prevented that some of mass-produced video projectors have a brightness characteristic that is out of a desired range.

Further, a user is allowed to adjust, by himself, the brightness balance so that it conforms to conditions of an environment where a video projector is used.

What is claimed is:

1. A projection-type video display apparatus which projects, onto a second screen, an image that is formed on a first screen by scanning it, comprising:

storing means for storing data indicating at least a brightness difference between a central portion and a peripheral portion of the second screen, and for outputting a brightness correction control signal so that it corresponds to a signal indicating a scanning position of the first screen;

amplifying means for amplifying an image signal, a gain of the amplifying means being changed in accordance with the brightness correction control signal that is output from the storing means;

maximum brightness point input means for allowing input of a maximum brightness point signal indicating a deviation of a maximum brightness point on the second screen; and function generating means for changing a shape of the signal indicating the scanning position of the first screen in accordance with the maximum brightness point signal.

2. The projection-type video display apparatus according to claim 1, wherein the maximum brightness point input means comprises first operating means for allowing input of a signal indicating a horizontal component of the deviation of the maximum brightness point, and a second operating means for allowing input of a signal indicating a vertical component of the deviation of the maximum brightness point.

3. The projection-type video display apparatus according to claim 2, further comprising a remote controller provided with the first and second operating means.

* * * * *